(12) United States Patent
Chamot et al.

(10) Patent No.: US 11,300,144 B2
(45) Date of Patent: Apr. 12, 2022

(54) AIR SUPPLY UNIT FOR A PNEUMATIC SYSTEM OF A COMMERCIAL VEHICLE

(71) Applicant: WABCO Europe BVBA, Brussels (BE)

(72) Inventors: Marcin Chamot, Kamienna Góra (PL); Radoslaw Czapiewski, Wroclaw (PL); Kamil Kostrzewa, Wroclaw (PL); Maciej Semeniuk, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 413 days.

(21) Appl. No.: 16/387,198

(22) Filed: Apr. 17, 2019

(65) Prior Publication Data

US 2019/0316610 A1  Oct. 17, 2019

(30) Foreign Application Priority Data

Apr. 17, 2018 (EP) .................................... 18167778

(51) Int. Cl.
*B01D 53/26* (2006.01)
*B60T 17/00* (2006.01)
(Continued)

(52) U.S. Cl.
CPC ........ *F15B 21/048* (2013.01); *B01D 46/0036* (2013.01); *B01D 53/0446* (2013.01);
(Continued)

(58) Field of Classification Search
CPC .. B01D 53/04; B01D 53/047; B01D 53/0446; B01D 53/261; B01D 2257/80;
(Continued)

(56) References Cited

U.S. PATENT DOCUMENTS 3,696,588 A   10/1972 Dussourd et al.
5,458,676 A * 10/1995 Herbst ................. B01D 53/261
                                                          96/109

(Continued)

FOREIGN PATENT DOCUMENTS

EP    2127727 A1    12/2009
WO    2007142008 A1 12/2007

OTHER PUBLICATIONS

European Search Report for EP Application No. 18167778 dated Sep. 21, 2018, 7 pages.

(Continued)

*Primary Examiner* — Frank M Lawrence, Jr.
(74) *Attorney, Agent, or Firm* — Warner Norcross + Judd LLP

(57) ABSTRACT

An air supply unit for a pneumatic system is provided herein. The unit includes a compressor inlet for receiving compressed air in a supply mode. The unit further includes a consumption outlet for connecting at least one consumption circuit. The unit further includes an air processing unit connected to the compressor inlet for drying and filtering the compressed air and delivering dried compressed air at its outlet. The unit further includes a supply line extending from the outlet to the consumption outlet. The unit further includes a purge tank connected to the supply line. The purge tank is connected to the supply line through a throttle for pressure reduction of the purge air. In order to realize a short filling time, the purge tank is further connected to the supply line by a filling valve. The filling valve is open in the supply mode and blocking in the purge mode.

16 Claims, 2 Drawing Sheets

(51) Int. Cl.
  *F15B 21/048* (2019.01)
  *B01D 46/00* (2022.01)
  *B01D 53/04* (2006.01)
  *F15B 1/027* (2006.01)
  *F15B 21/14* (2006.01)
(52) U.S. Cl.
  CPC ............ *B01D 53/261* (2013.01); *F15B 1/027* (2013.01); *F15B 21/14* (2013.01); *B01D 2257/80* (2013.01); *B01D 2259/40086* (2013.01); *B01D 2259/4566* (2013.01); *F15B 2211/205* (2013.01); *F15B 2211/212* (2013.01); *F15B 2211/88* (2013.01)
(58) Field of Classification Search
  CPC .. B01D 2259/40086; B01D 2259/4566; B01D 46/0036; B60T 17/004; F15B 1/027; F15B 1/265; F15B 21/048; F15B 21/14; F15B 2211/205; F15B 2211/212; F15B 2211/30505; F15B 2211/40507; F15B 2211/88

USPC ........ 96/113, 134, 144; 95/97, 98, 117, 122; 34/80, 472, 473
See application file for complete search history.

(56) References Cited

U.S. PATENT DOCUMENTS 5,917,139 A * 6/1999 Goodell ............... B01D 53/261
  96/113
7,338,550 B2 * 3/2008 Hoffman ................ B60B 35/08
  55/385.2

OTHER PUBLICATIONS

Machine assisted translation of WO2007142008A1 obtained from https://patents.google.com on Apr. 16, 2019, 8 pages.
Machine assisted translation of EP2127727A1 obtained from https://patents.google.com on Apr. 16, 2019, 16 pages.

* cited by examiner

AIR SUPPLY UNIT FOR A PNEUMATIC SYSTEM OF A COMMERCIAL VEHICLE

CROSS-REFERENCE TO RELATED APPLICATIONS

This application claims priority to European Patent Application No. 18167778.2, filed Apr. 17, 2018, which is incorporated herein by reference in its entirety.

FIELD OF THE DISCLOSURE

The disclosure relates to an air supply unit for use in a pneumatic system of a commercial vehicle and a method of operating an air supply unit.

BACKGROUND

In commercial vehicles comprising a pneumatic system, a compressor is driven by the motor shaft of the vehicle motor or vehicle engine and supplies compressed air to an air supply unit. The air supply unit comprises an air processing unit for filtering and drying or de-moisturing the compressed air in a supply mode. The processed air (dried compressed air) is then supplied to one or more consumption circuits. Further, a portion of the dried compressed air is stored in a purge tank.

The air supply unit comprises a valve arrangement for setting pressure limits and enabling a regeneration mode or purge mode. Therefore, the valve arrangement outputs a pneumatic unloader control signal for stopping the compressor. In the regeneration mode, purge air stored in the purge tank passes in a reverse direction through the air processing unit to an exhaust. Thus, the air supply unit is switched between at least the supply mode and the purge mode.

The purge tank can be combined with or integrated in the valve arrangement of the air supply unit, in order to provide one single unit. The air processing unit is typically utilized with a desiccant cartridge, which can easily be replaced.

Air supply units comprising electro-pneumatic valves for switching between the modes are more complicated and expensive. The valves are controlled by electric signals output by an ECU. Air supply units comprising only pneumatically controlled valves are typically controlled by the pressure conditions or the pressure situation; in particular, the pneumatic unloader signal for stopping the compressor may be generated when a pressure output to the consumer circuits reaches a pressure threshold.

A pneumatically controlled air supply unit, however, in general includes a limited volume for the purge tank, which is used for de-moisturing the desiccant cartridge. Further the purge tank is connected to an internal supply line by a throttle or an orifice for supplying the purge air flow in the purge mode with a lower pressure. Filling the purge tank with a high pressure therefore takes more time.

Using high flow compressors for filling the consumer circuits within a shorter filling time can lead to a situation, in which the output pressure at the consumer circuits reaches the pressure threshold for stopping or unloading the compressor, although the purge tank is not completely filled.

Therefore it is an object of the disclosure to realize an air supply unit for a pneumatic system of a commercial vehicle which enables short filling times of the purge tank and a high efficiency of the purge modes.

BRIEF SUMMARY

An air supply unit for a pneumatic system of a commercial vehicle is provided herein. The air supply unit includes a compressor inlet to be connected to a compressor for receiving compressed air when the air supply unit is in a supply mode. The air supply unit further includes a consumption outlet for connecting at least one consumption circuit of the commercial vehicle. The air supply unit further includes an air processing unit connected to the compressor inlet for drying and filtering the compressed air and generating dried compressed air. The air supply unit further includes the air processing unit adapted to receive the compressed air from the compressor inlet and deliver the dried compressed air to an outlet. The air supply unit further includes a supply line extending from the outlet to the consumption outlet of the air supply unit. The air supply unit further includes a purge tank connected to the supply line for receiving and storing the dried compressed air from the supply line as stored dried compressed air when the air supply unit is in the supply mode and delivering the stored dried compressed air as purge air when the air supply unit is in a purge mode through the supply line to the air processing unit for regenerating the air processing unit. The air supply unit further includes a separating valve connected between a first section and an end section of the supply line. The end section extends to the consumption outlet. The purge tank is connected to the supply line through a throttle for pressure reduction of the purge air. The purge tank is further connected to the supply line by a filling valve. The filling valve is open when the air supply unit is in the supply mode and blocking when the air supply unit is in the purge mode.

A method for operating an air supply unit of a commercial vehicle is also provided herein. The method includes operating the air supply unit in a supply mode. The supply mode includes drying compressed air supplied from a compressor in an air processing unit to generate dried compressed air. The supply mode further includes supplying dried compressed air through a supply line to a consumption outlet to connected consumption circuits and to a purge tank in the air supply unit for storing the dried compressed air in the purge tank as purge air. The method further includes operating the air supply unit in a regeneration mode. The regeneration mode includes supplying the purge air from the purge tank through the supply line and the air processing unit to an exhaust for de-moisturing the air processing unit. The dried compressed air filling the purge tank in the supply mode flows through a larger cross-section than the purge air in the regeneration mode.

BRIEF DESCRIPTION OF THE DRAWING

The invention is described in greater detail below with reference to the accompanying figures, in which.

DETAILED DESCRIPTION

Figure 1:
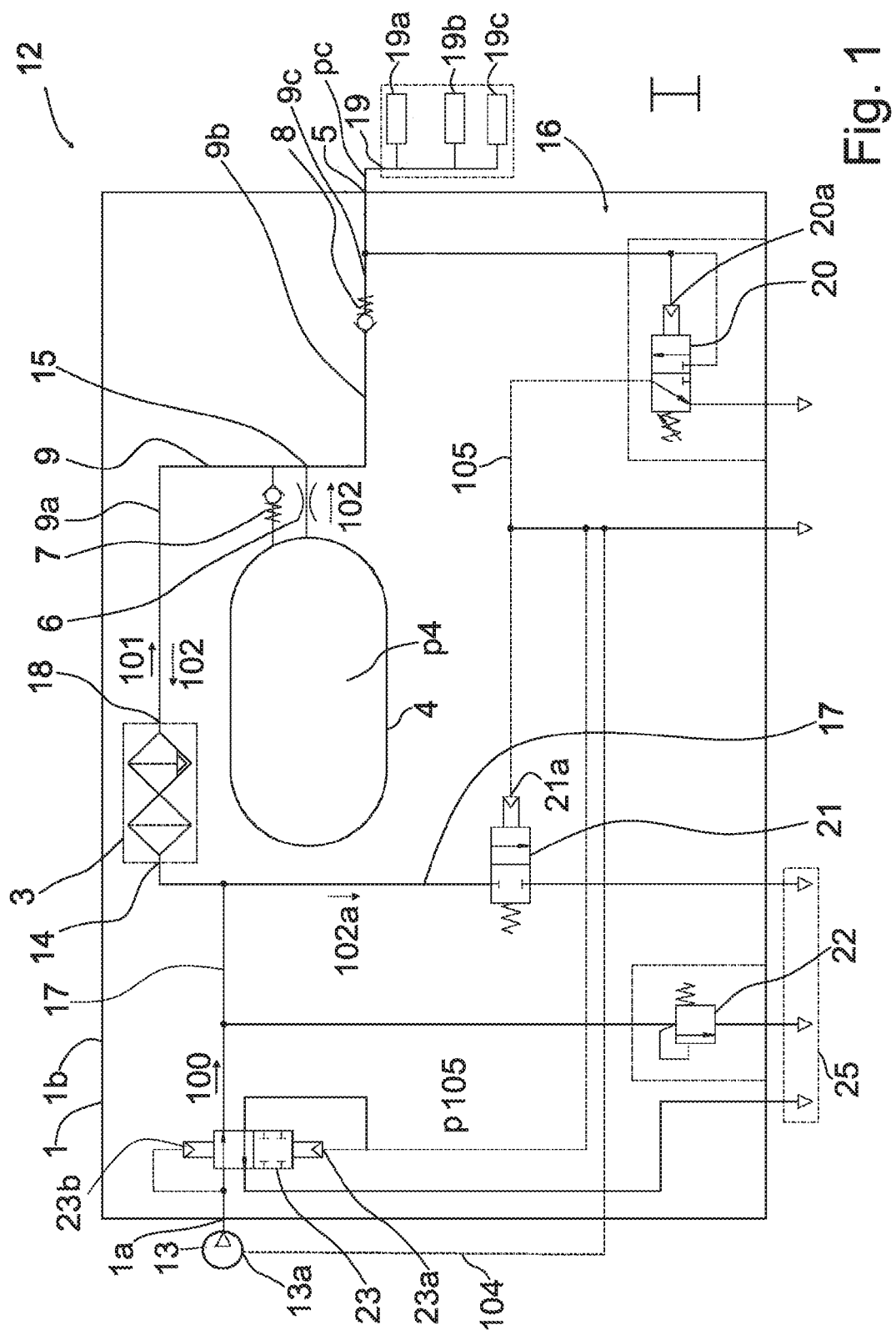
FIG. 1 is a is a pneumatic scheme of a pneumatic system of a vehicle comprising a supply unit according to a first embodiment of the disclosure.

With reference to the specific embodiment of the figures, wherein like numerals generally indicate like parts throughout the several views, an air supply unit is provided herein. Further a method for operating the air supply unit is provided herein.

Thus, a filling valve is provided between the supply line and the purge tank, which an additional filling valve is provided to the throttle. According to certain embodiments, the throttle and the filling valve are connected in parallel between the purge tank and the supply line.

The additional feature of the filling valve does not require a significant higher hardware effort. The filling valve is typically utilized as a non-return valve or check valve, allowing only an air flow from the supply unit to the purge tank. The cross-section of the filling valve can be significantly larger than the cross-section of the throttle. The additional filling valve leads to a significant shorter filling time compared to conventional systems. Thus, the dimension or characteristics of the throttle can be designed in order to optimize the purge air flow, and the filling time can be determined by the additional filling valve. Thus, these two air flows can be designed independently of each other.

The throttle and the filling valve can, in certain embodiments, be designed as one part, for example by a non-return valve with an air gap or ring gap, which corresponds to a "non-tight check valve", which is as cheap as a commercially available non-return valve. Thus, a small hardware amendment leads to significant benefits in the operation modes, such as, to a shorter filling time and the possibility of designing the air flow for filling the purge tank independently of the purge air flow.

According to various embodiments, the pressure in the purge tank can be designed independently from the consumer pressure provided at the consumer outlet. This independent pressure provision can be realized by additional valve arrangements in the supply line between the air processing unit and the consumer outlet.

Further successive phases of the supply mode can be provided, in embodiments, a first phase for filling the purge tank at least partially, a second phase for supplying the consumer circuits, in certain embodiments, together with the purge tank, and in various embodiments, a third phase for filling the purge tank with a higher pressure without supplying the consumer circuits can be provided, which phases can be set by the valve arrangement.

The supply line extending from the air processing unit to the consumer outlet can, in general, be divided into a first section extending from the air processing unit to a junction area for connecting the purge tank, a second section from the junction area to a separating valve, in certain embodiments, a non-return valve for separating the connected consumer circuit from the purge tank, and an end section between the separating valve and the consumer outlet.

According to an embodiment an overflow valve can be provided in the second section, i.e. before the separating valve, in order to block the flow of dried compressed air from the supply line to the consumer outlet up to a first pressure threshold; the overflow valve opens when reaching the first pressure threshold and therefore, filling the purge tank at least partially in a first phase in has a priority over filling the connected consumer circuits.

According to a further embodiment, a pressure limiting valve can be provided in the end section of the supply line or at the consumer outlet, in order limit the consumer pressure supplied by the air supply unit. Thus, the pressure valve closes when reaching a second threshold at its outlet, i.e. in the connected consumer circuits. Afterwards the dried processed air in the supply line is used for filling the purge tank with a higher pressure.

Thus, the additional amendments provide a design of an air supply unit with a purge tank comprising a higher maximum pressure or maximum purge pressure, which can be designed higher than the consumer pressure provided for the connected consumer circuits. One advantage of such an arrangement is to design a smaller air supply unit, such as an air supply unit with a smaller purge tank, since the total mass of purge air stored in the purge tank can be optimized by a higher purge tank pressure.

FIG. 1 depicts a pneumatic system 12 of a commercial vehicle, e. g. a truck. The pneumatic system 12 comprises an air supply unit 1 according to a first embodiment of the disclosure, a compressor 13 and at least one consumption circuit 19; the pneumatic system 12, in certain embodiments, comprises several consumption circuits 19a, 19b, 19c, such as pneumatic brake circuits, suspension circuits and further pneumatic consumers. Further a trailer can be connected as an air consumption circuit.

The air supply unit 1 comprises a compressor inlet 1a connected to the compressor 13. The compressor 13 is in general driven by the engine of the commercial vehicle, such as directly by a motor shaft. The compressor 13 comprises a pneumatic control input 13a for receiving a pneumatic compressor (unloader) signal p105 for switching the compressor 13 into an idle mode or switching it off.

The at least one consumption circuit 19 is connected to a consumption outlet 5 of the air supply unit 1.

In FIG. 1, in various embodiments, the supply unit 1 is in a supply mode I in which the compressor 13 supplies compressed air 100 to the compressor inlet 1a, which compressed air 100 passes through an open compressor line separating valve (compressor valve) 23 to an inlet 14 of an air processing unit 3. In these embodiments, the compressed air 100 is filtered and dried in the air processing unit 3 and delivered as dried compressed air 101 through a supply line 9 to the consumption outlet 5.

A purge tank 4 is provided inside of the air supply unit 1 and connected to the supply line 9 by a parallel connection of a filling valve 7 and a throttle 6. The filling valve 7 is utilized as a non-return valve which only allows the dried compressed air 101 to pass from the supply line 9 into the purge tank 4. Thus, in the supply mode I depicted in FIG. 1, the dried compressed air 101 flows from an outlet 18 of the air processing unit 3 through a first section 9a of the supply line 9 to a junction area 15, and then through the non-return valve 7 and through the throttle 6 into the purge tank 4. Due to its larger cross section, the filling valve 7 enables a larger air flow than the throttle 6 which comprises an orifice, i.e. a significantly smaller cross section.

Behind the junction area 15 a separating valve 8 is provided in the supply line 9, for allowing only the dried compressed air 101 to flow from the air processing unit 3 to the consumption outlet 5; a reverse flow may not be possible. Thus, the supply line 9 can be divided into the first section 9a between the outlet 18 of the air processing unit 3 and the junction area 15, a second section 9b between the junction area 15 and the separating valve 8, and an end section 9c between the separating valve 8 and the consumption outlet 5. The separating valve 8 may be utilized as a non-return valve; therefore the pressure in the second section 9b of the supply line can flow through the end section, if the air pressure p9b in the second section 9b may be higher than the consumer pressure pc in the end section 9c.

The first and second section 9a, 9b are directly connected to each other, and the second section 9b is not as important for the function; the separating valve 8 can be connected directly to the junction area 15, and therefore the supply line 9 can be realized with only a first section 9a, the separating valve 8 and the end section 9c. The junction area 15 can be realized as a single point, or—as depicted in FIG. 1—the throttle 6 and the filling valve 7 can be connected to the first section 9a in two points slightly separated from each other.

It is to be remarked that according to an embodiment, no switchable valve is provided for initializing the purge mode II; the purge mode II according to this embodiment of a pneumatic system is realized autonomously. Further, no electric signal is provided, and none of the valves in the air supply unit 1 comprises or is realized as a solenoid valve to receive an electric input.

However, the junction area 15 can be equipped with a further functional valve in order to enable a rest mode without air supply and without purge activity.

According to another embodiment, pneumatically as well as electronically controlled valves can be provided; such as the control valve utilizing a solenoid valve (electronically controlled valve). In such an embodiment it is possible to replace the electronically controlled control valve by a pneumatically controlled control valve (a mechanical governor) if needed, such as in case of failure. Thus, a kind of "pneumatically fallback level" can be realized with low effort.

When the commercial vehicle is started and the vehicle engine is running, the compressor 13 starts to compress air and pumps the compressed air 100 into the compressor inlet 1*a*. The air supply unit 1 may be in its supply mode I depicted in FIG. 1, therefore the compressed air 100 flows to the air processing unit 3, and dried compressed air 101 is afterwards flowing through the supply line 9. Thus, the purge tank 4 may be filled through the filling valve 7 and the throttle 6. Further, according to this embodiment, a part of the dried compressed air 101 flows through the second section 9*b*, the separating valve 8 and the end section 9*c* to the consumption outlet 5 and to the at least one consumption circuit 19.

The regeneration mode II or purge mode is described hereinafter. A purge valve 21 may be realized as a pneumatically controlled 2/2-valve with the pneumatic control input 21*a* and connects the inlet 14 of the air processing unit 3 to an exhaust 25, which—as usual—is connected to a silencer. The purge valve 21 is shown in its blocking basic position and is switched by a pneumatic control signal p105 output from a control valve 20. The purge valve 20 may be realized as a 3/2-valve with a pneumatic control input 20*a* which is connected to the end section 9*c*, therefore the a pneumatic control input 20*a* is connected to the consumption outlet 5. In the supply mode I depicted in FIG. 1 the pneumatic control area 105 between the control valve 20 and the purge valve 21 is vented by the control valve 20 being in its basic state and therefore, the purge valve 21 remains in its blocking basic state. When the pressure pc in the end section 9*c* and at the consumption outlet 5 reaches a purge pressure threshold ptr, then the control valve 20 is switched into its active position and thereby connects the end section 9*c* to the compressor control line 104.

Thus, the consumer pressure pc may be passing the control valve 20 to the control input 21*a* of the purge valve 21 and switches the purge valve 21 into its active position, in which it connects the inlet 14 of the air processing unit 3 to the exhaust 25. Further the compressor control line 104 may be connected to the first pneumatic control input 23*a* of the compressor line separating valve 23 and switches the compressor line separating valve 23 into its blocking position, in which the compressor inlet 1*a* may be separated from the inlet 14 of the air processing unit 3.

Thus, the inlet line 17 may be separated from the compressor inlet 1*a* and connected to the exhaust 25. Further the compressor control line 104 may be connected to the pneumatic control input 13*a* of the compressor 13 and therefore, the compressor 13 may be unloaded or switched off by the compressor control signal p105.

Thus, in the purge mode II the valves 20, 21 and 23 may be switched with respect to FIG. 1, and the compressor 13 may be switched off or switched into its idle mode. The purge tank 4 has already been filled in the preceding supply mode I and therefore the purge tank pressure p4 in the purge tank 4 may be higher than the pressure in the first and second section 9*a*, 9*b* of the supply line 9. Thus air stored in the purge tank 4 is output through the throttle 6 as purge air 102 and flows through the first section 9*a* to the outlet 18, then in reverse direction through the air processing unit 3 to its inlet 14, and from the inlet line 17 through the open purge valve 21 to the outlet 25. Thus moisture in the air processing unit 3 can be transported by the purge air 102 to the exhaust 25 in order to dry or regenerate the air processing unit 3.

The throttle 6 helps to save the air stored in the purge tank 4 to realize a longtime purge air flow for regenerating the processing unit 3. In the purge mode II, the filling valve 7, which may be utilized as a non-return valve, blocks and therefore only the reduced air flow through the throttle 102 with lower pressure and therefore a higher total volume may be possible.

Thus, a quick filling of the purge tank 4 with dried air 101 is realized by the filling valve 7 together with the throttle 6, and a long-time flow of the purge air 102 is realized by the throttle 6 without the filling valve 7.

The transition from the purge mode II back to the supply mode I may be initiated by the consumer pressure pc in the end section 9*c*. If the pressure stored in the at least one consumption circuit 19 and the end section 9*c* drops below the purge pressure threshold ptr, then the control valve 20 switches back into its basic position thereby separating the end section 9*c* and venting the control area 105 as well as the pneumatic compressor control line 104, which leads to two results:

The compressor 13 switches into its supply state or basic state and supplies compressed air 100 to the compressor inlet 1*a* of the air supply unit 1 and the compressor line separating valve 23 is switched back by the compressed air 100, therefore the supply mode I depicted in FIG. 1 is again reached.

Further the purge valve 21 switches back into its blocking basic position, thereby separating the inlet line 17 from the exhaust 25.

Figure 2:
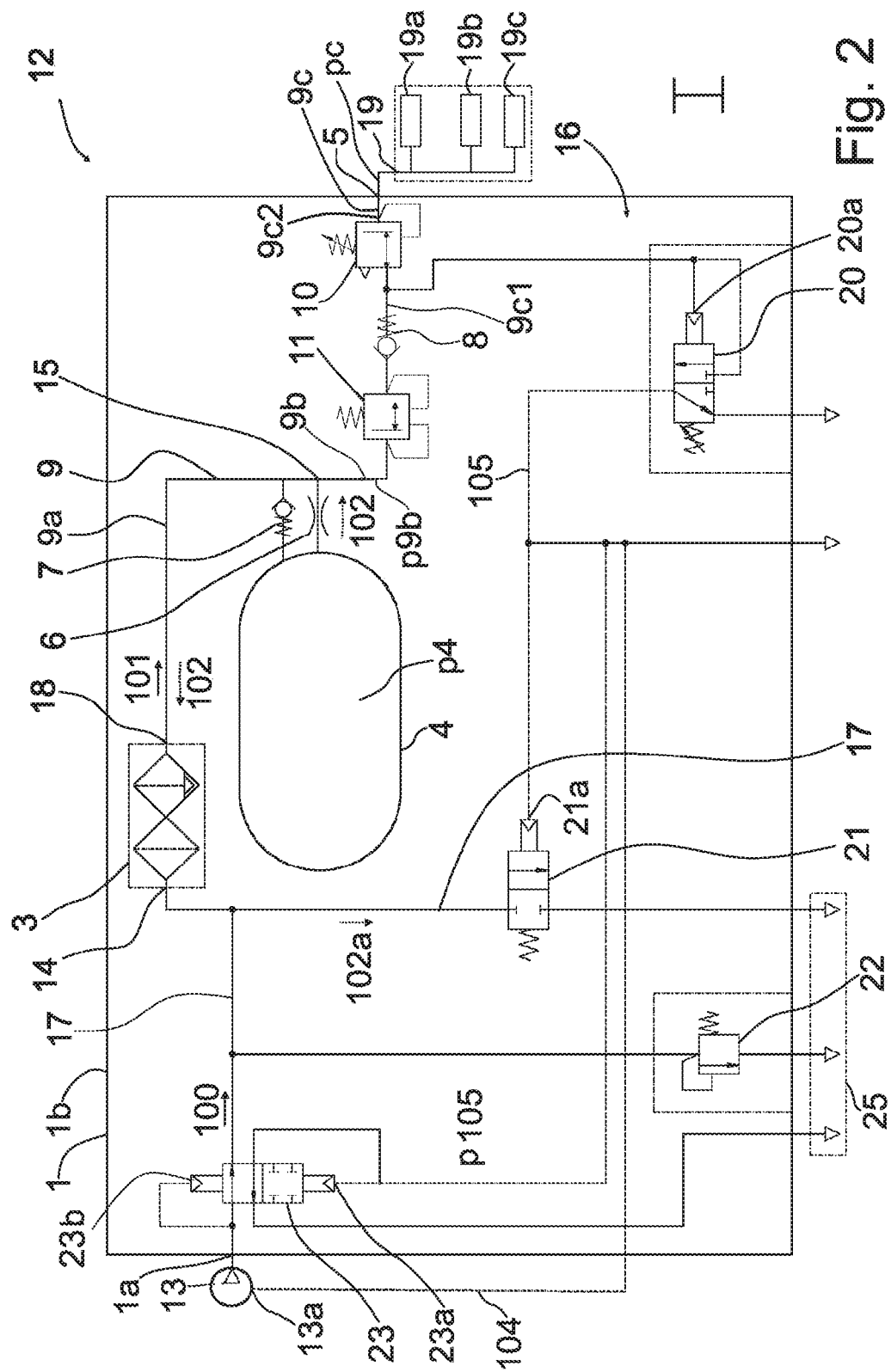
FIG. 2 is a is a pneumatic scheme of a pneumatic system of a vehicle comprising a supply unit according to a second embodiment of the disclosure.

FIG. 2 depicts a pneumatic system 12 with an air supply unit 1 according to another embodiment of the disclosure. The air supply unit 1 of FIG. 2 corresponds in general to the device of FIG. 1; however, an overflow valve 11 may be additionally provided in the second section 9*b* and further, a pressure limiting valve 10 may be provided in the end section 9*c*. Each of these two features can be provided independently of each other, respectively. FIG. 2 depicts an embodiment comprising both features, which may be advantageous. The other parts of the air processing unit 1 can be realized according to FIG. 1.

The overflow valve 11 is provided in the second section 9*b*, i.e. between the junction area 15 and the separating valve 8. However, the overflow valve 11 and the separating valve 8, which is a non-return valve, can be utilized as a combined valve arrangement 8, 11. The overflow valve 11 may be closed at lower input pressures at its first side or input side (from the supply line 9) and opens at a first pressure threshold pt11, e. g. pt11=11 bar, at its input side; thus it opens when the second pressure p9*b* in the second section 9*b* reaches the first pressure threshold pt11. Thus filling the purge tank 4 has priority over supplying the consumption circuits 19. In a first phase the purge tank 4 may be filled at least partially, such as with a purge pressure p4=11 bar, and afterwards the overflow valve 11 opens and enables a pressure supply of the end section 9c and the consumption circuits 19.

The pressure limiting valve 10 may be provided in the end section 9c, such as between the control input 20a of the control valve 20 and the consumption outlet 5. The pressure limiting valve 10 may be limiting the outlet pressure or consumer pressure pc to a predetermined value, i.e. 12 bar. Thus a higher pressure can be realized in the first section 9a and the second section 9b and therefore, a higher purge tank pressure p4 in the purge tank p4, e. g. p4=16 bar, can be realized. Such a higher purge tank pressure p4 corresponds to a higher stored purge air volume or a higher mass of stored purge air; alternatively, the purge tank 4 can be utilized with a smaller volume for storing a required total mass of purge air 102. The supply mode I and the purge mode II as described above are not affected by such a higher tank pressure p4:

The transition from the supply mode I to the purge mode II may be controlled by the pressure in the end section 9c, which acts upon the control input 20a of the control valve 20 and the control input 21a of the purge valve 21, in order to switch between the modes I and II.

Thus, in FIG. 2 in the first phase of the supply mode I the dried compressed air 101 may be used for filling the purge tank 4 with a purge tank pressure p4=11 bar, then in the second phase the overflow valve 11 opens and the end sections 9c and the consumer circuits are filled with the consumer pressure pc, then the pressure limiting valve 10 closes when the consumer pressure pc reaches pc=12 bar, and in a third phase the purge tank may be filled with the end pressure p4=16 bar.

The pressure limiting valve 10 separates the end section 9c into a first part 9c1 between the separating valve 8 and the pressure limiting valve 10, and a second part 9c2 which extends to the consumption outlet 5 and therefore may be connected to the consumption circuits 19. The pressure limiting valve 10 closes at a second pressure threshold pt10 in the second part 9c2 of the end section 9c. Thus, the pressure limiting valve 10 closes when reaching this second pressure threshold p10 and afterwards, a higher pressure can be established in the first part 9c1, the second section 9b and the first section 9a. Thus, the purge tank 4 can be filled with this higher pressure p4. Therefore, the pressure limiting valve 10 enables an independent setting of the pressure p4 in the purge tank 4 and the consumer pressure pc in the consumption circuits 19.

The air supply unit 1 can be utilized with a single 1b, in which the compressor inlet 1a and the consumption outlet 5 are utilized. Thus, the purge tank 4 may be contained in the casing 1b; in general, a desiccant cartridge of the air processing unit 3 can be placed outside to enable an easy replacement.

The foregoing embodiments can be realized with a non-electric control valve (mechanical governor), or with an electrically controlled control valve (solenoid control valve).

LIST OF REFERENCE NUMERALS (PART OF THE DESCRIPTION)

1 air supply unit
1a compressor inlet of the air supply unit 1
1b casing, of the air supply unit 1
3 air processing unit
4 purge tank
5 consumption outlet, of the air supply unit 1
6 throttle
7 filling valve (non-return valve, check valve)
8 separating valve, typically non-return valve
9 supply line
9a first section of the supply line 9
9b second section of the supply line 9
9c end section of the supply line 9
9c1 first part of the end section
9c2 second part of the end section
10 pressure limiting valve
11 overflow valve
12 pneumatic system, of the commercial vehicle
13 compressor
13a pneumatic control input of the compressor 13
14 inlet, of the air processing unit 3
15 junction area
16 regeneration control valve assembly, purge control valve assembly
17 inlet line
18 outlet, of the air processing unit 3
19 consumption circuit or pneumatic consumption circuits
19a, 19b, 19c pneumatic consumption circuit
20 control valve, e.g. Governor
20a pneumatic control input, of the control valve
21 purge valve
21a pneumatic control of the purge valve 21
22 security overflow valve, of the input line 17
23 compressor line separating valve
23a first control input of the compressor line separating valve 23
23b second control input of the compressor line separating valve 23
25 exhaust, e.g. to a silencer
100 compressed air, supplied by the compressor 13 to the inlet line 17
101 dried compressed air
102 purge air
102a purge air with moisture
104 compressor control line
105 control area
I supply mode
II purge mode
p4 purge tank pressure
pc consumer pressure, pressure in end section 9c and in the consumer circuits 19
p9b second pressure in second section 9b
pt10 second pressure threshold
pt11 first pressure threshold of overflow valve 11
p105 pneumatic compressor control signal, unloader signal
ptr purge pressure threshold The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values.

Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. An air supply unit for a pneumatic system of a commercial vehicle, the air supply unit comprising:
    a compressor inlet to be connected to a compressor for receiving compressed air when the air supply unit is in a supply mode,
    a consumption outlet for connecting at least one consumption circuit of the commercial vehicle,
    an air processing unit connected to the compressor inlet for drying and filtering the compressed air and generating dried compressed air, the air processing unit adapted to receive the compressed air from the compressor inlet and deliver the dried compressed air to an outlet,
    a supply line extending from the outlet to the consumption outlet of the air supply unit,
    a purge tank connected to the supply line for receiving and storing the dried compressed air from the supply line as stored dried compressed air when the air supply unit is in the supply mode and delivering the stored dried compressed air as purge air when the air supply unit is in a purge mode through the supply line to the air processing unit for regenerating the air processing unit, and
    a separating valve connected between a first section and an end section of the supply line, the end section extending to the consumption outlet,
    wherein the purge tank is connected to the supply line through a throttle for pressure reduction of the purge air,
    wherein the purge tank is further connected to the supply line by a filling valve,
    wherein the filling valve is open when the air supply unit is in the supply mode and blocking when the air supply unit is in the purge mode,
    wherein the first section of the supply line extends between the air processing unit and a junction area and a second section of the supply line extends between the junction area and the end section, wherein the dried compressed air flows through the first and second sections, and wherein the purge air only flows through the first section, and
    wherein the at least one consumption circuit has a consumer pressure, wherein the air supply unit comprise a pressure limiting valve in the end section between the separating valve and a consumer outlet, for limiting the consumer pressure in the at least one consumption circuit and enabling a higher pressure in the purge tank than in the at least one consumption circuit, and wherein the pressure limiting valve closes when the consumer pressure in the at least one consumption circuit reaches a second pressure threshold.

2. The air supply unit according to claim 1, wherein the throttle and the filling valve are connected in parallel between the purge tank and the junction area of the supply line.

3. The air supply unit according to claim 2, wherein the filling valve is a non-return valve for enabling only a flow of the dried compressed air into the purge tank and blocking a flow of purge air from the purge tank to the supply line.

4. The air supply unit according to claim 1, wherein the air supply unit comprises a casing in which the compressor inlet and the consumption outlet are provided,
    wherein the purge tank is provided inside the casing, and optionally wherein a desiccant cartridge of the air processing unit extends outside the casing.

5. The air supply unit according to claim 1, wherein an overflow valve is provided in the second section, optionally between the purge tank and the separating valve, wherein the overflow valve is closed, when a second pressure in the second section and/or a purge tank pressure in the purge tank is lower than a first threshold, in order to set priority for filling the purge tank over filling the at least one consumer circuit.

6. The air supply unit according to claim 1, wherein the air supply unit comprises only pneumatic valves without electric control inputs.

7. The air supply unit according to claim 1, wherein the air supply unit comprises pneumatic valves and electric control inputs.

8. The air supply unit according to claim 1, wherein the air supply unit switches between the supply mode and the purge mode in dependence of a pressure in the end section of the supply line, optionally only in dependence of the pressure in the end section.

9. A pneumatic system of a commercial vehicle, comprising:
    an air supply unit according to claim 1,
    wherein the compressor is driven by a vehicle engine and is connected to the compressor inlet of the air supply unit, and
    at least one consumer circuit connected to the consumer outlet of the air supply unit.

10. The pneumatic system according to claim 9, wherein the air supply unit outputs a pneumatic compressor control signal to a pneumatic control input of the compressor in order to switch the compressor into an idle state or switch it off in dependence of the consumer pressure at the consumer outlet.

11. A method for operating the air supply unit according to claim 1 of a commercial vehicle, the method comprising:
 operating the air supply unit in the supply mode, comprising;
  drying compressed air supplied from the compressor in the air processing unit to generate dried compressed air, and
  supplying dried compressed air through the supply line to the consumption outlet to connected consumption circuits and to the purge tank in the air supply unit for storing the dried compressed air in the purge tank as purge air; and
 operating the air supply unit in a regeneration mode, comprising;
  supplying the purge air from the purge tank through the supply line and the air processing unit to an exhaust for de-misting the air processing unit;
 wherein the dried compressed air filling the purge tank in the supply mode flows through a larger cross-section than the purge air in the regeneration mode.

12. The method according to claim 11, wherein the larger cross-section is realized by the filling valve, which is opened in the supply mode and blocking in the regeneration mode.

13. The method according to claim 11, wherein in the supply mode:
 in a first phase, the purge tank is filled at least partially with dried compressed air and
 in a subsequent second phase, the dried compressed air is supplied to the consumption outlet and the purge tank.

14. The method according to claim 13, wherein the purge tank is filled in the first phase until a purge tank pressure reaches a first pressure threshold and afterwards the dried compressed air is supplied to the consumption outlet.

15. The method according to claim 13, wherein in a third phase, the supply of dried compressed air to the consumption outlet is stopped and the purge tank is filled up to its final purge tank pressure.

16. The method according to claim 11, wherein the pressure of the dried compressed air supplied to the consumption outlet is limited and lower than the final purge tank pressure.

\* \* \* \* \*